United States Patent [19]

Watanabe et al.

[11] Patent Number: 5,163,707
[45] Date of Patent: Nov. 17, 1992

[54] AUTOMATIC SEAT BELT SYSTEM

[75] Inventors: Yasutaka Watanabe; Takashi Kawaharazaki, both of Aichi, Japan

[73] Assignee: Kabushiki Kaisha Tokai-Rika-Denki-Seisakusho, Aichi, Japan

[21] Appl. No.: 658,857

[22] Filed: Feb. 21, 1991

[30] Foreign Application Priority Data

Mar. 19, 1990 [JP] Japan .................. 2-27942[U]

[51] Int. Cl.⁵ ............................................. B60R 22/06
[52] U.S. Cl. ................................... 280/804; 280/808; 297/469; 297/483
[58] Field of Search ..................... 280/802, 804, 808; 297/473, 469, 483, 486

[56] References Cited

U.S. PATENT DOCUMENTS

| | | | |
|---|---|---|---|
| 4,597,588 | 7/1986 | Kawai | 280/804 |
| 4,607,863 | 8/1986 | Yokote | 280/804 |
| 4,750,758 | 6/1988 | Yamamoto et al. | 280/804 |
| 4,776,611 | 10/1988 | Tamura et al. | 280/804 |

Primary Examiner—Kenneth R. Rice
Attorney, Agent, or Firm—Sixbey, Friedman, Leedom & Ferguson

[57] ABSTRACT

An automatic seat belt system in which a slider supported by a guide rail and adapted to be worn by a vehicle occupant is moved from a webbing-application canceling position to a webbing applying position so as to apply the webbing around the occupant. The automatic seat belt system includes a slider holding portion for retaining the slider at the webbing applying position and movable along the guide rail in the retaining state, and a lock pin for retaining the slider holding member onto a chassis by being inserted in a hole provided in the chassis and for setting the slider holding member in a movable state as the lock pin is pulled out of the hole. Also provided is a controller for moving the slider by a predetermined distance from the webbing applying position toward the webbing-application canceling position by reversely rotating the motor before the lock pin is pulled out of the hole. Accordingly, when the lock pin is pulled out of the hole, a large frictional force does not act between the lock pin and an inner peripheral portion of the hole.

18 Claims, 12 Drawing Sheets

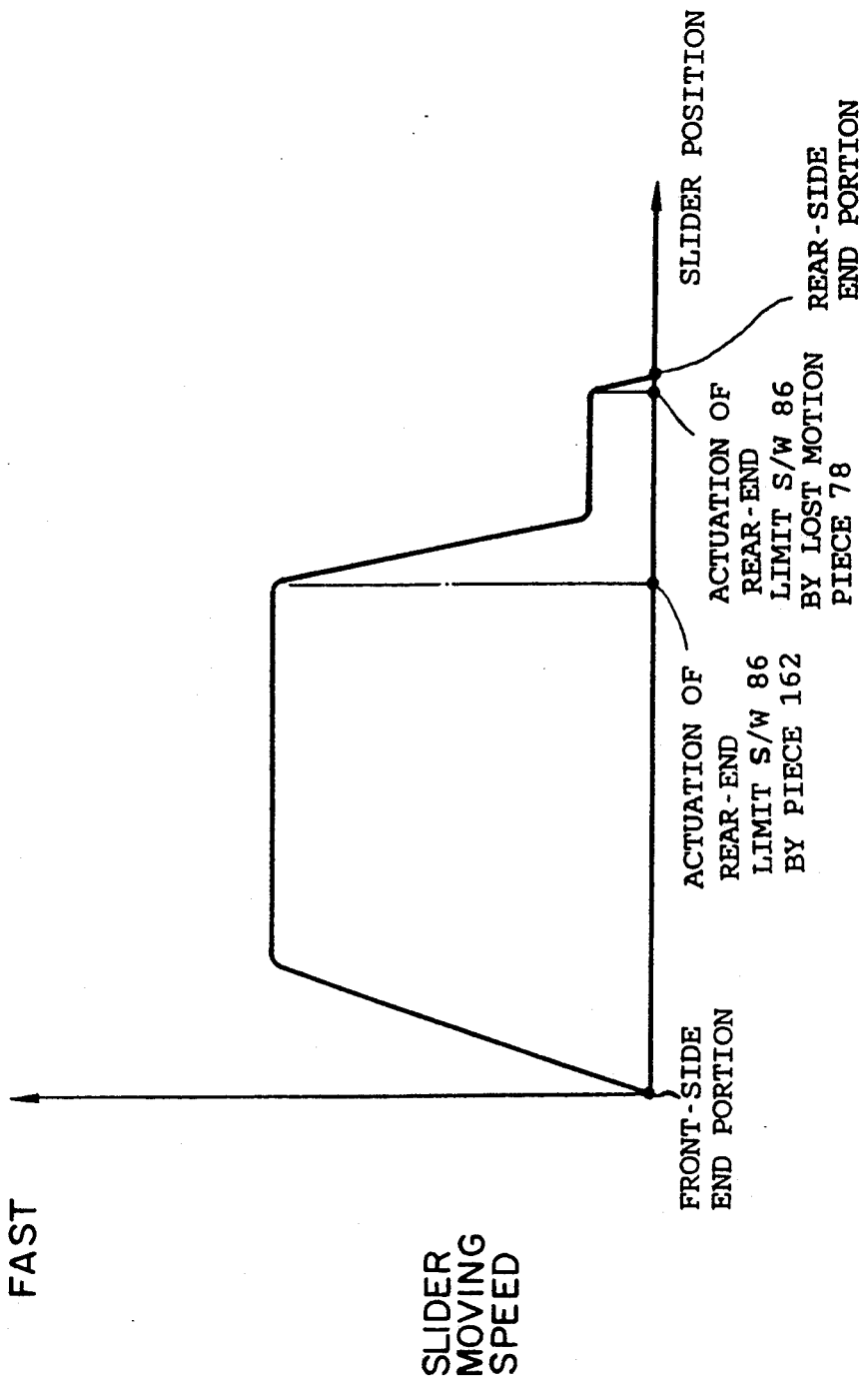

AUTOMATIC SEAT BELT SYSTEM

BACKGROUND OF THE INVENTION

1. Field of the Invention

The present invention relates to an automatic seat belt system, and more particularly to an automatic seat belt system having a mechanism of adjusting the height of a webbing worn by a seat occupant of a vehicle.

2. Description of the Related Art

In an automatic seat belt system of this type, one end of a webbing is retained by a slider disposed movably along a guide rail. The slider is connected to a motor via an elongated flexible tape or a wire, and is adapted to move along the guide rail as the motor rotates.

A slider holding member (shoulder anchor) is disposed at one end portion of the guide rail on the rear side of the vehicle. The shoulder anchor has a lock shaft capable of engaging with the slider, and is connected to a reinforcing member of a side wall of a chassis via a lock pin. As the slider engages with the lock shaft, the slider is connected to and held by the reinforcing member via the lock pin. In addition, the shoulder anchor is so arranged that the position at which it is connected to the reinforcing member by means of the lock pin can be changed along the guide rail.

When a occupant is seated in a vehicle seat and the door is closed, the slide moves in the rearward direction of the vehicle along the guide rail as the motor is driven. When the slider reaches a predetermined position, the slider is brought into contact with the shoulder anchor and is held thereby, and the position at which the slider is held is detected by a limit switch, whereupon the driving of the motor is stopped. The occupant thus assumes a state in which the webbing is applied to him or her.

In addition, if the occupant alters the position at which the shoulder anchor is connected to the reinforcing member by means of the lock pin, it is possible to adjust the position at which the slider is held, i.e., the height of the webbing worn by the occupant. Thus, even if the occupant has a different physical constitution, the webbing can be applied properly around him or her.

With such a conventional automatic seat belt system having a mechanism for adjusting the height of the webbing worn, the motor is stopped if the slider is held by the shoulder anchor, as described above. However, even after the motor stops, the slider and the flexible tape move slightly owing to the inertia of these components and the motor. For this reason, at a point of time when the slider and the flexible tape are brought to a complete stop, load acting in the direction of movement of the slider owing to the movement of these members is applied to that portion of the shoulder anchor which is connected to the reinforcing member by means of the lock pin. Hence, the lock pin and the reinforcing member remain abutting against each other with this load acting on them.

Consequently, when the occupant temporarily cancels the connection between the lock pin and the reinforcing member by moving the shoulder anchor along the guide rail so as to adjust the height of the webbing worn, a large frictional force is generated between the lock pin and the reinforcing member. Hence, a large operating force becomes necessary, so that there has been a drawback in that the operational feature involved in adjusting the height of the webbing worn is undermined.

SUMMARY OF THE INVENTION

Accordingly, an object of the present invention is to provide an automatic seat belt system in which the operational feature is improved by reducing an operating force required in moving a slider holding member, thereby facilitating the adjustment of the height of a webbing worn.

To this end, in accordance with one aspect of the present invention there is provided an automatic seat belt system comprising: a guide rail disposed in a vehicle compartment; a slider to which a webbing for restraining an occupant of the vehicle is attached and which is adapted to be guided by the guide rail so as to be movable between a webbing-application canceling position and a webbing applying position; a driving source for moving the slider along the guide rail between the webbing-application canceling position and the webbing applying position; a slider holding member for holding the slider by being engaged therewith at the webbing applying position, and capable of moving in a longitudinal direction of the guide rail relative to the guide rail; retaining means for causing the slider holding member to be retained by a chassis at one of a plurality of positions set along the longitudinal direction of the guide rail, engagement of the slider holding member with the the chassis capable of being canceled by an operation; and controlling means for controlling the slider via the driving source in such a manner that the slider is located at a position where load resisting the operation does not act on the retaining means, at least at the time of the operation of the retaining means.

With the automatic seat belt system having the above-described arrangement, at least at the time of effecting an operation for altering the position at which the slider holding means of the retaining means is retained by the chassis (the position at which the slider is held), the slider is controlled by the controlling means via the driving source in such a manner as to be located at a position where load resisting the operation is not applied to the retaining means.

Accordingly, it is possible to alter the position at which the slider holding member is retained as the retaining means is moved to the occupant's desired position with a light operating force, thereby facilitating the adjustment of the height of the webbing worn.

In accordance with another aspect of the present invention, the controlling means is adapted to effect the control of the slider when the slider is held by the slider holding member.

Accordingly, at the time of effecting an operation for altering the position at which the slider holding member of the retaining means is retained by the chassis, the load resisting the operation is not applied to the retaining means. Hence, it is possible to alter the retaining position of the slider holding member by moving the retaining means to the occupant's desired position with a light operating force, thereby facilitating the adjustment of the height of the webbing worn.

In accordance with still another aspect of the present invention, the controlling means comprises altering operation detecting means for detecting the operation of the retaining means, and is adapted to effect the control of the slider when the operation is detected by the altering operation detecting means.

Accordingly, when the operation of the retaining means is effected, the operation is detected by the altering operation detecting means, whereby the slider is controlled, and no load resisting the operation for altering the retaining position acts on the retaining means.

Hence, it is possible to alter the retaining position of the slider holding member by moving the retaining means to the occupant's desired position with a light operating force, thereby facilitating the adjustment of the height of the webbing worn.

In accordance with a further aspect of the invention, the controlling means comprises position detecting means for detecting a predetermined position of the slider before the slider is held by the slider holding member, and is adapted to effect the control of the slider by stopping the driving source when the predetermined position is detected by the position detecting means.

When the driving source is stopped, the slider and so on move slightly owing to the inertia of the driving source and the slider itself, and when the slider stops completely and is held by the slider holding member, no load resisting the operation for altering the retaining position acts on the retaining means.

Hence, it is possible to alter the retaining position of the slider holding member by moving the retaining means to the occupant's desired position with a light operating force, thereby facilitating the adjustment of the height of the webbing worn.

In accordance with a still further aspect of the invention, the controlling means comprises position detecting means for detecting a predetermined position of the slider before the slider is held by the slider holding member, and is adapted to effect the control of the slider by decelerating the speed of the driving source when the predetermined position is detected by the position detecting means and by subsequently stopping the driving source.

When the speed of the driving source is decelerated, the inertia of the driving source and the slider itself is reduced gradually, and when the slider subsequently stops completely and is held by the slider holding member, no load resisting the operation for altering the retaining position acts on the retaining means.

Hence, it is possible to alter the retaining position of the slider holding member by moving the retaining means to the occupant's desired position with a light operating force, thereby facilitating the adjustment of the height of the webbing worn.

The other objects, features and advantages of the present invention will become more apparent from the following detailed description when taken in conjunction with the accompanying drawings.

BRIEF DESCRIPTION OF THE DRAWINGS

FIG. 12 is a diagram illustrating changes in the moving speed of the slider due to the actuation of a rear-end limit switch.

DESCRIPTION OF THE PREFERRED EMBODIMENTS

Figure 1:
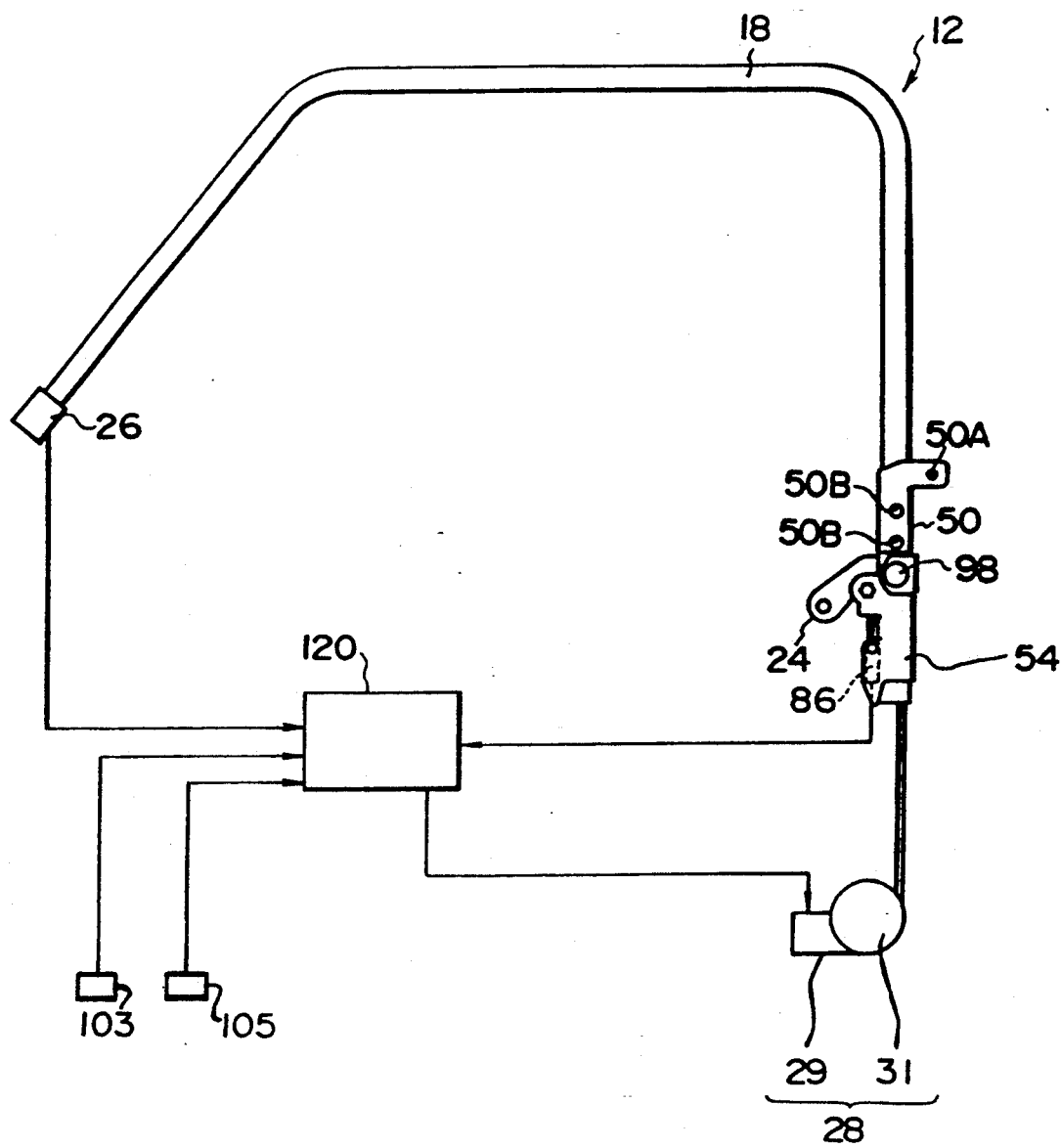
FIG. 1 is a diagram schematically illustrating an overall arrangement of an automatic seat belt system in accordance with a first embodiment of the present invention.
Figure 2:
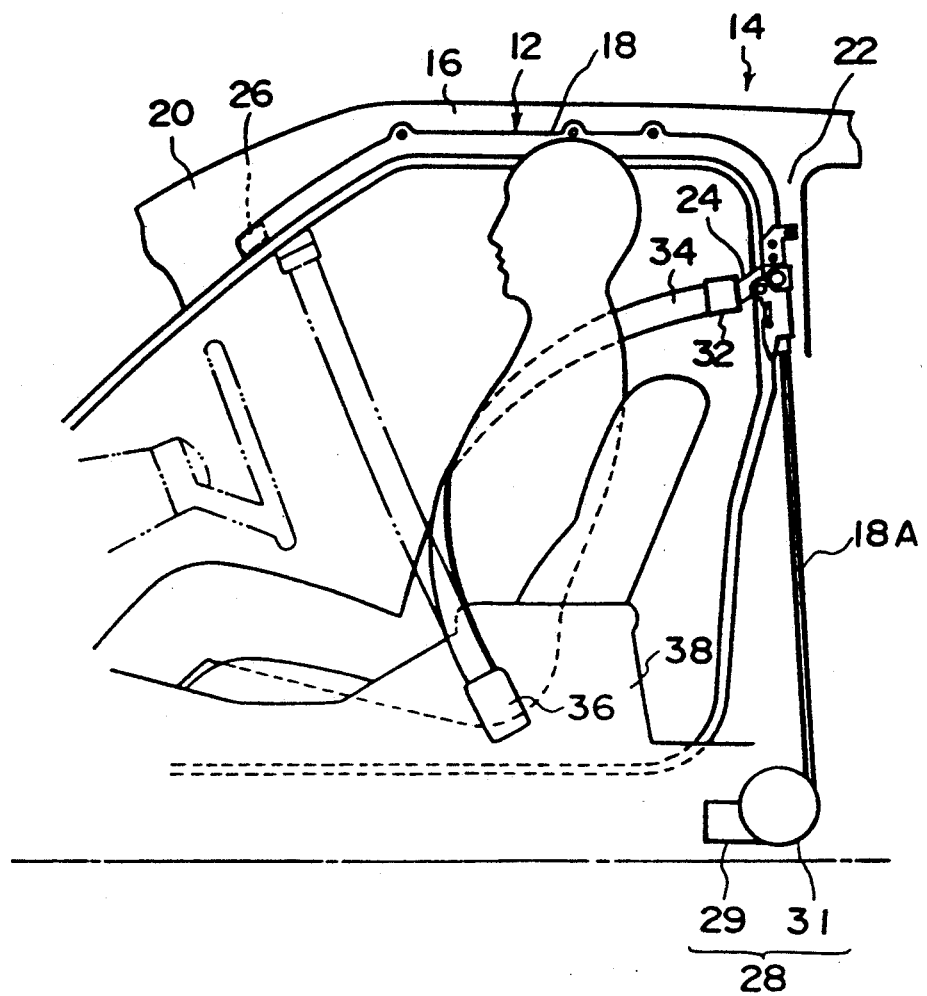
FIG. 2 is an overall diagram of the automatic seat belt system illustrating a state in which a webbing is worn by an occupant.

FIGS. 1 and 2 schematically illustrate an overall arrangement of an automatic seat belt system 12 in accordance with a first embodiment of the present invention.

A guide rail 18 is disposed on a roof side 16 of a vehicle 14. A end portion of the guide rail 18 on the front side of the vehicle extends along a front pillar 20, and the other end portion thereof on the rear side of the vehicle is bent substantially orthogonally downward along a center pillar 22. A slider 24 is supported movably by the guide rail 18.

One end of a webbing 34 is connected to a distal end of the slider 24 via a connecting member 32 such as a buckle, and the other end of the webbing 34 is accommodated in a takeup device 36 disposed in a central portion of the vehicle by being taken up onto it in the form of a roll. An inertia lock mechanism is incorporated in the takeup device 36 so as to instantly prevent the drawing out of the webbing 34 by sensing a sudden acceleration by means of an acceleration sensor during an emergency of the vehicle. The takeup device 36 is secured to a chassis inside a center console 38.

Figure 3:
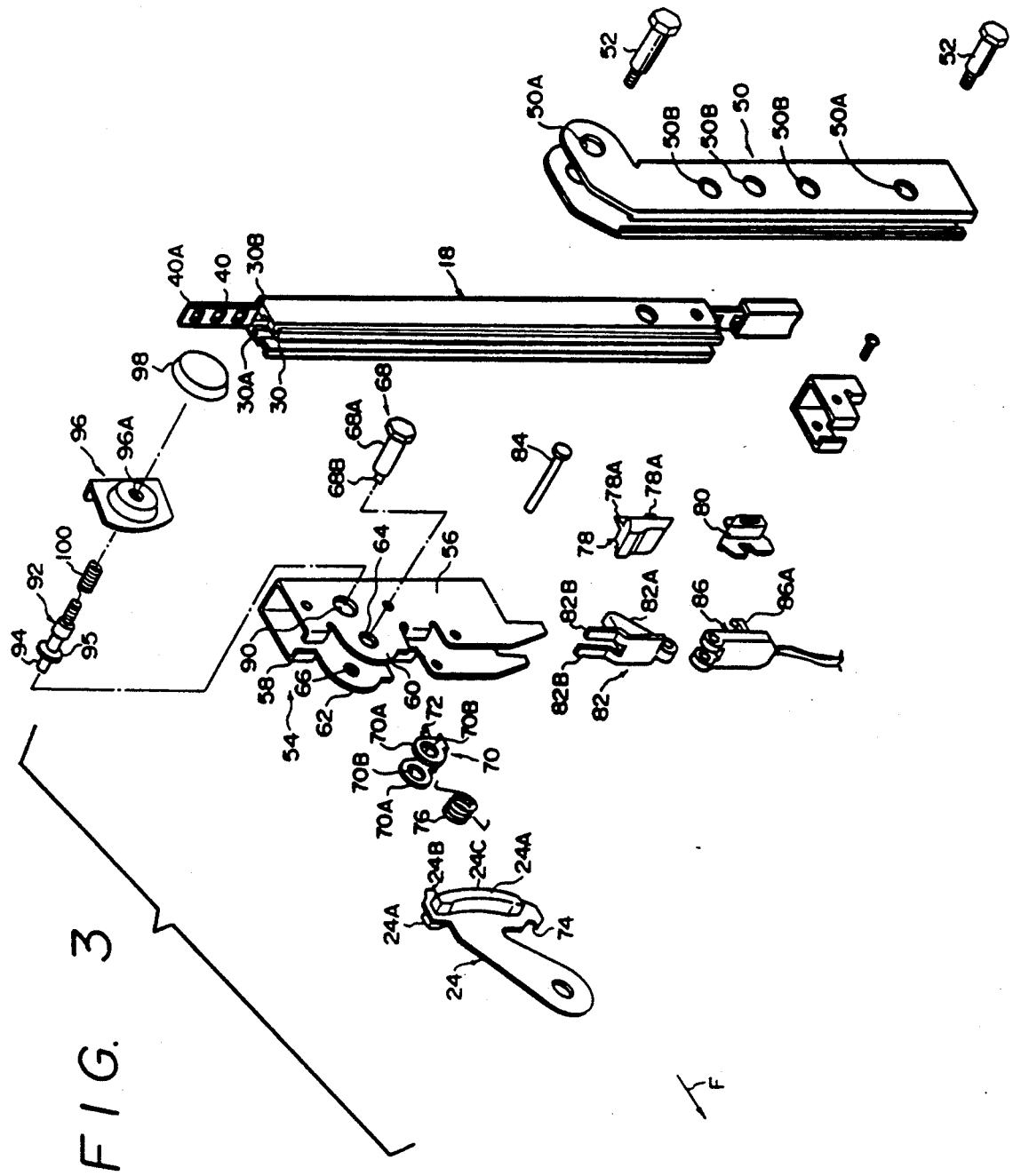
FIG. 3 is an exploded perspective view of a movable plate and its peripheral components.

As shown in detail in FIG. 3, a groove 30 is provided in the guide rail 18 in the longitudinal direction thereof. A pair of mutually opposing recesses 30A are formed in the side walls of the groove 30, and a tape accommodating groove 30B for accommodating a tape 40 is formed continuously in a bottom wall of the groove 30.

Meanwhile, an enlarged-diameter guide portion 24A and a head portion 24B are formed on the slider 24. A surface of the guide portion 24A which is opposite to the webbing is formed as an arcuate surface 14C having a gentle arcuate configuration along the longitudinal direction of the guide portion 24A. The enlarged-diameter guide portion 24A and the head portion 24B are adapted to be inserted slidably in the groove 30.

Figure 4:
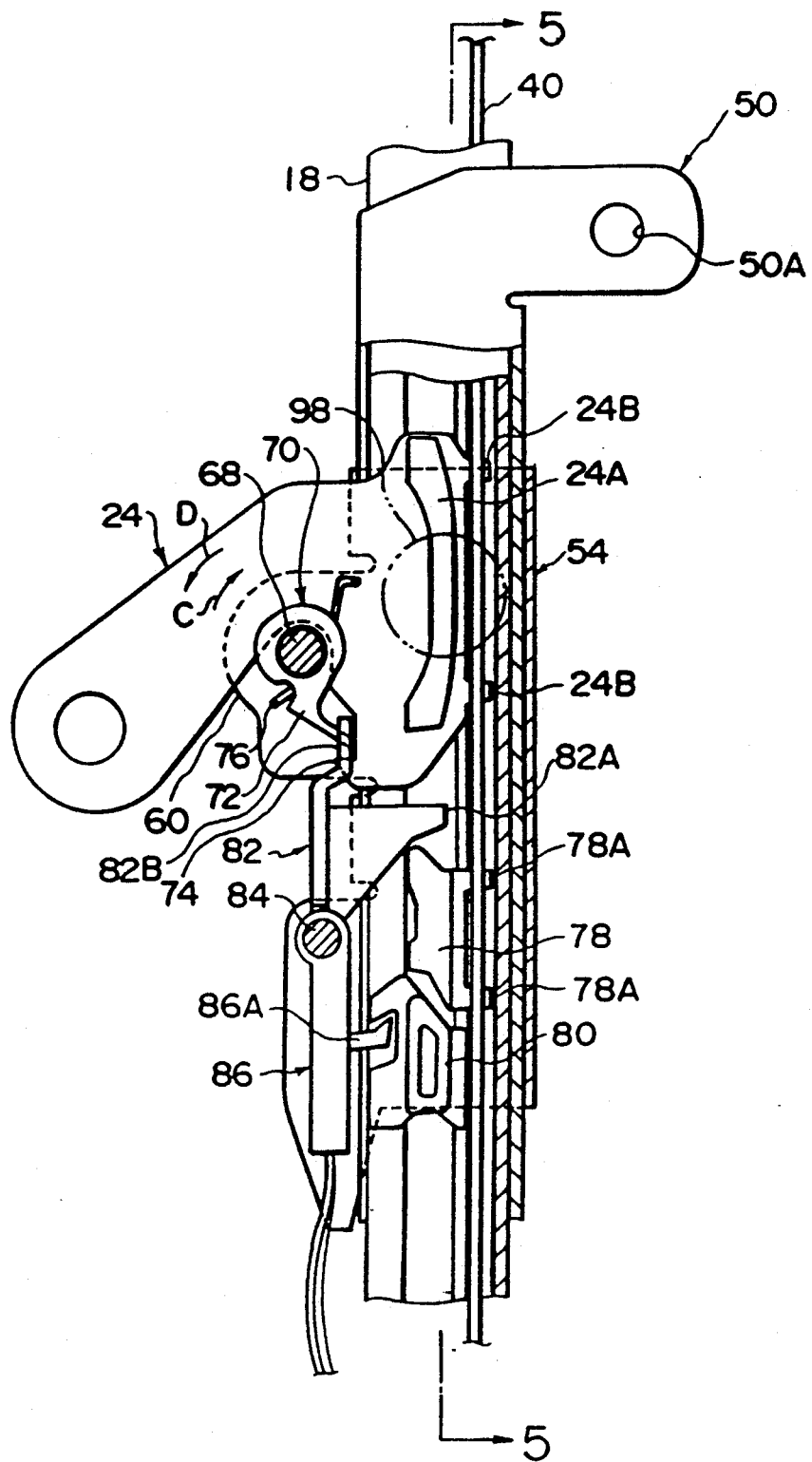
FIG. 4 is a vertical cross sectional view, partly broken way, of the movable plate and its peripheral components.
Figure 5:
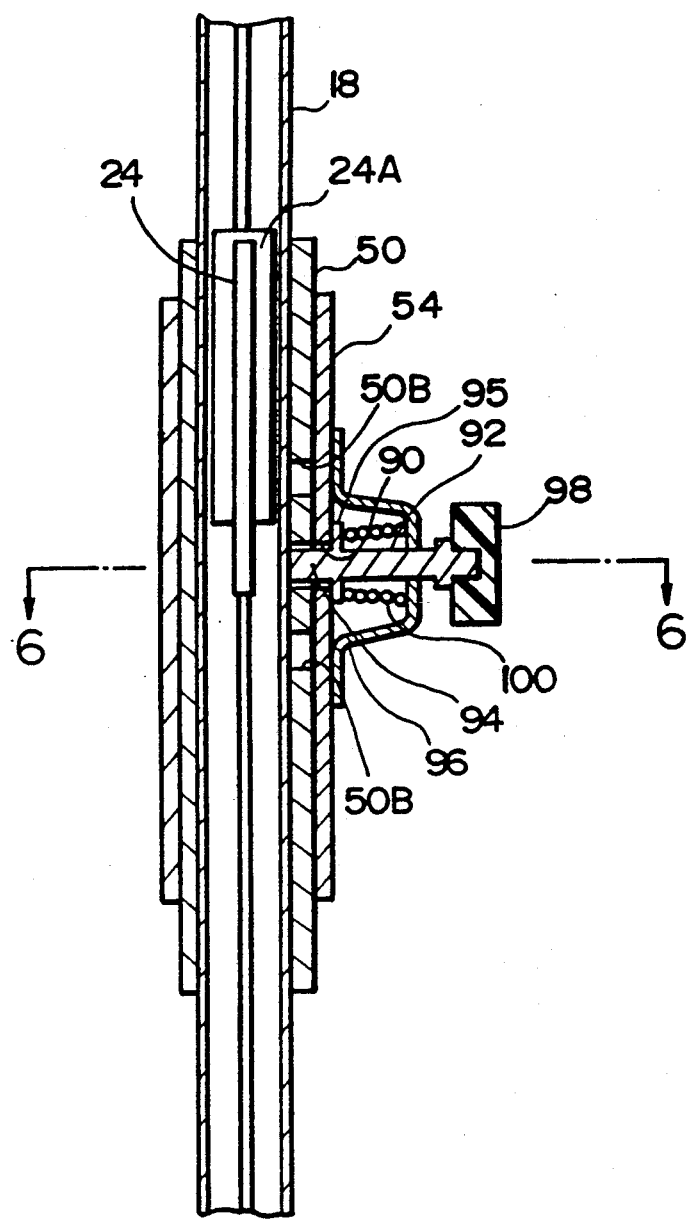
FIG. 5 is a vertical cross-sectional view taken along the line 5—5 of FIG. 4 and illustrating a state of engagement of a lock pin.

As shown in FIG. 4, the head portion 24B of the slider 24 is connected to the elongated tape 40 by means of one of its openings 40A, so that the slider 24 also moves in the longitudinal direction of the vehicle as the tape 40 move in the longitudinal direction of the vehicle (vertically in FIG. 4). Each of the openings 40A of the tape 40 in which the head portion 24B is inserted is elongated in the longitudinal direction of the tape 40, and the slider 24 is relatively movable slightly in the longitudinal direction of the tape 40.

A reinforcement 50 constituting a retaining means is disposed on an outer periphery of the end portion (i.e., lower portion) of the guide rail 18 on the rear side of the vehicle. The reinforcement 50, which is made of a steel plate and formed into a substantially box-shaped configuration, covers the guide rail 18 and receives the load acting on the guide rail 18 so as to reinforce the guide rail 18. Circular holes 50A are formed in an upper-end bent portion and a lower end portion of the reinforcement 50, respectively. The arrangement provided is such that a bolt 52 is inserted to each of the circular holes 50A so as to secure the reinforcement 50 to the main body of the vehicle. It should be noted that the circular holes 50A on the lower end portion are located at such a position which will not hamper the movement of the tape 40.

A movable plate 54 constituting a slider holding member is disposed around an outer periphery of the reinforcement 50 in such a manner as to be slidable by a predetermined amount along the longitudinal direction (vertically in FIG. 3) of the reinforcement 50. This movable plate 54 is formed by bending a steel plate such that it is provided with a substantially U-shaped cross section with leg plates 56, 58 formed parallel with each other on both sides thereof.

The leg plates 56, 58 are provided with projections 60, 62 projecting with a substantially semicircular configuration toward the front of the vehicle (in the direction of arrow F in FIG. 3). Circular holes 64, 66 are formed horizontally and coaxially in the projections 60, 62, respectively. The arrangement provided is such that a large-diameter portion 68A of a stepped anchor pin 68 is inserted trough the circular hole 64 and a small-diameter portion 68B thereof through the circular hole 66.

As shown in FIG. 4, the stepped anchor pin 68 is located closer to the front side of the vehicle than the guide portion 24A of the slider 24 and is adapted to support the tension of the webbing 34. In addition, the stepped anchor pin 68 pivotally supports a pawl 70. A pair of leg plates 70A are formed on opposite sides of the pawl 70, and pin insertion holes 70B are formed coaxially in these leg plates 70A. The large-diameter portion 68A of the stepped anchor pin 68 is inserted in the pin insertion holes 70B. An engaging portion 72 is formed on a part of the pawl 70, and the engaging portion 72 corresponds to a recess 74 formed in the slider 24.

A torsion coil spring 76 is fitted around the large-diameter portion 68A of the stepped anchor pin 68 for supporting the pawl 70, and urges the engaging portion 72 about the stepped anchor pin 68 in the direction allowing the engaging portion 72 to be engaged with the recess 74 of the slider 24 (in the direction of arrow D in FIG. 4). When the engaging portion 72 is engaged with the recess 74 of the slider 24, the slider 24 is locked and is unable to move along the guide rail 18.

A circular hole 90 is formed in the vicinity of the circular hole 64 provided in the leg plate 56 of the movable plate 54. When the movable plate 54 is slid vertically, this circular hole 90 is selectively made to correspond with one of a plurality of circular holes 50B formed in the reinforcement 50 and constituting the retaining means. A lock pin 92 which similarly constitutes the retaining means is supported by a tension holder 96 outwardly of the circular hole 90.

Figure 6:
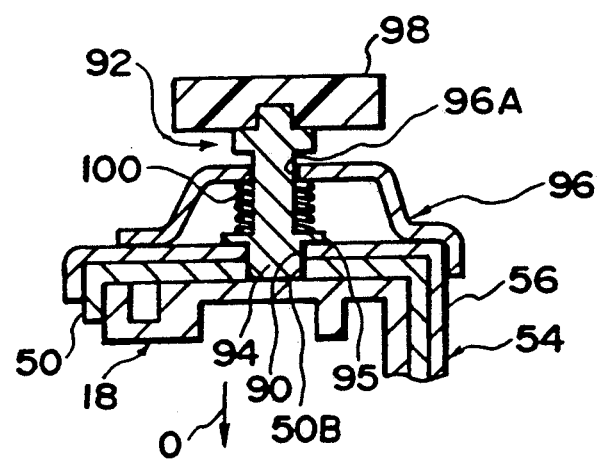
FIG. 6 is a horizontal cross-sectional view taken along the line 6—6 of FIG. 5 and illustrating a knob and its peripheral components.

As shown in FIG. 6, a large-diameter portion 94 is formed at one end of the lock pin 92, and is inserted in the circular hole 90. The large-diameter portion 94, after being inserted in the circular hole 90, is further inserted in the circular hole 50B, whereby the movable plate 54 is connected to and supported by the reinforcement 50. Furthermore, in this case, as the movable plate 54 is slid along the reinforcement 50, the large-diameter portion 94 can be fitted in a different one of the circular holes 50B, so that the connecting position of the movable plate 54 can be altered.

A disk-shaped flange 95 is formed on the large-diameter portion 94 of the lock pin 92 in such a manner as to project radially. In addition, after an intermediate portion of the lock pin 92 is inserted in a through hole 96A of the tension holder 96, the other end of the lock pin 92 is threadingly engaged with a nob 98. A compression coil spring 100 is interposed between the tension holder 96 and the flange 95, so that the lock pin 92 is constantly urged outwardly in the transverse direction of the vehicle (in the direction of arrow O in FIG. 6).

As shown in FIG. 4, a pair of projections 78A of a lost motion piece 78 are connected to the tape 40, and the lost motion piece 78 is adapted to abut against a sliding piece 80 as the lost motion piece 78 moves downwardly (downwardly in FIG. 4) together with the tape 40.

As shown in FIG. 3, a lost motion lever 82 and a rear-end limit switch 86 constituting a detecting means are pivotally supported by the movable plate 54 by means of a pin 84.

A projection 82A projecting toward the rear of the vehicle (rightward in FIG. 4) and a bifurcating extension portion 82B with a small width extending toward the pawl 70 are formed integrally on the lost motion lever 82. Tip portions of this extension portion 82B abut against the pawl 70 with the engaging portion 72 of the pawl 70 placed therebetween. Accordingly, as shown in FIG. 4, as the lost motion piece 78 moves downwardly with the movement of the tape 40, the lost motion piece 78 abuts against the projection 82A of the lost motion lever 82, so that the lost motion lever 82 rotates counterclockwise about the pin 84. Consequently, the extension portion 82B presses the engaging portion 72 of the pawl 70 against the urging force of the torsion coil spring 76 in the direction in which the engaging portion 72 moves away from the recess 74 of the slider 24.

A contactor 86A is projectingly formed on the rear-end limit switch 86. The sliding piece 80 which moves by being pressed by the lost motion piece 78 is capable of contacting the contactor 86A. The arrangement provided is such that as the contactor 86A is pressed by the sliding piece 80, the rear-end limit switch 86 is actuated so as to detect the stopping position of the slider 24, i.e., the tape 40. This rear-end limit switch 86 is connected to a CPU (central processing unit) 120 serving as a controlling means which will be described later.

The rear-end portion of the tap 40 projecting from the end of the guide rail 18 is guided by an auxiliary guide 18A extending from the guide rail 18, and is connected to a driving unit 28 serving as a driving source, as shown in FIG. 2. The driving unit 28 comprises a motor 29 and a gear portion 31.

Figure 7:
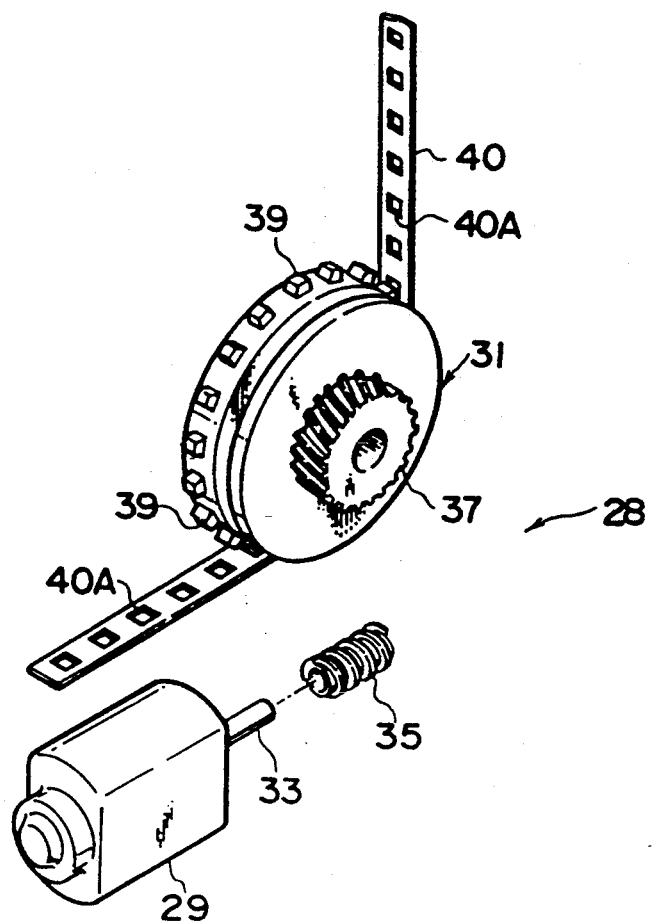
FIG. 7 is an exploded perspective view of a driving unit.

As shown in FIG. 7, a worm gear 35 is secured to a rotating shaft 33 of the motor 29. Meanwhile, a worm wheel 37 is formed on a side wall of the gear portion 31 and meshes with the worm gear 35 of the motor 29. In addition, teeth 39 meshing with the openings 40A of the tape 40 are formed on an outer periphery of the gear portion 31. For this reason, as the motor 29 is driven, its torque is transmitted to the tape 40 via the worm gear 35 and the worm wheel 37. This motor 29 is also connected to the CPU 120.

A front-end limit switch 26 is disposed at an end of the guide rail 18 on the front side of the vehicle in such a manner as to be capable of abutting against the slider 24. The front-end limit switch 26 is adapted to detect the front-side stopping position of the slider 24, and is connected to the CPU 120.

In addition, a door switch 103 for detecting the opening and closing of a vehicle door (not shown) and an ignition switch 105 are connected to the CPU 120, so that the state of operation of these switches can be detected.

The CPU 120 constitutes a core of a computer system and comprises an arithmetic unit, a control unit, and a storage unit. Connected to the CPU 120 are the front-end limit switch 26, the rear-end limit switch 86, the door switch 103, the ignition switch 105, and the motor 29, respectively. The CPU 120 is arranged to reversely rotate the motor 29 for a predetermined time after the rear-end limit switch 86 is turned on, e.g., immediately after the slider 24 is stopped.

Figure 8:
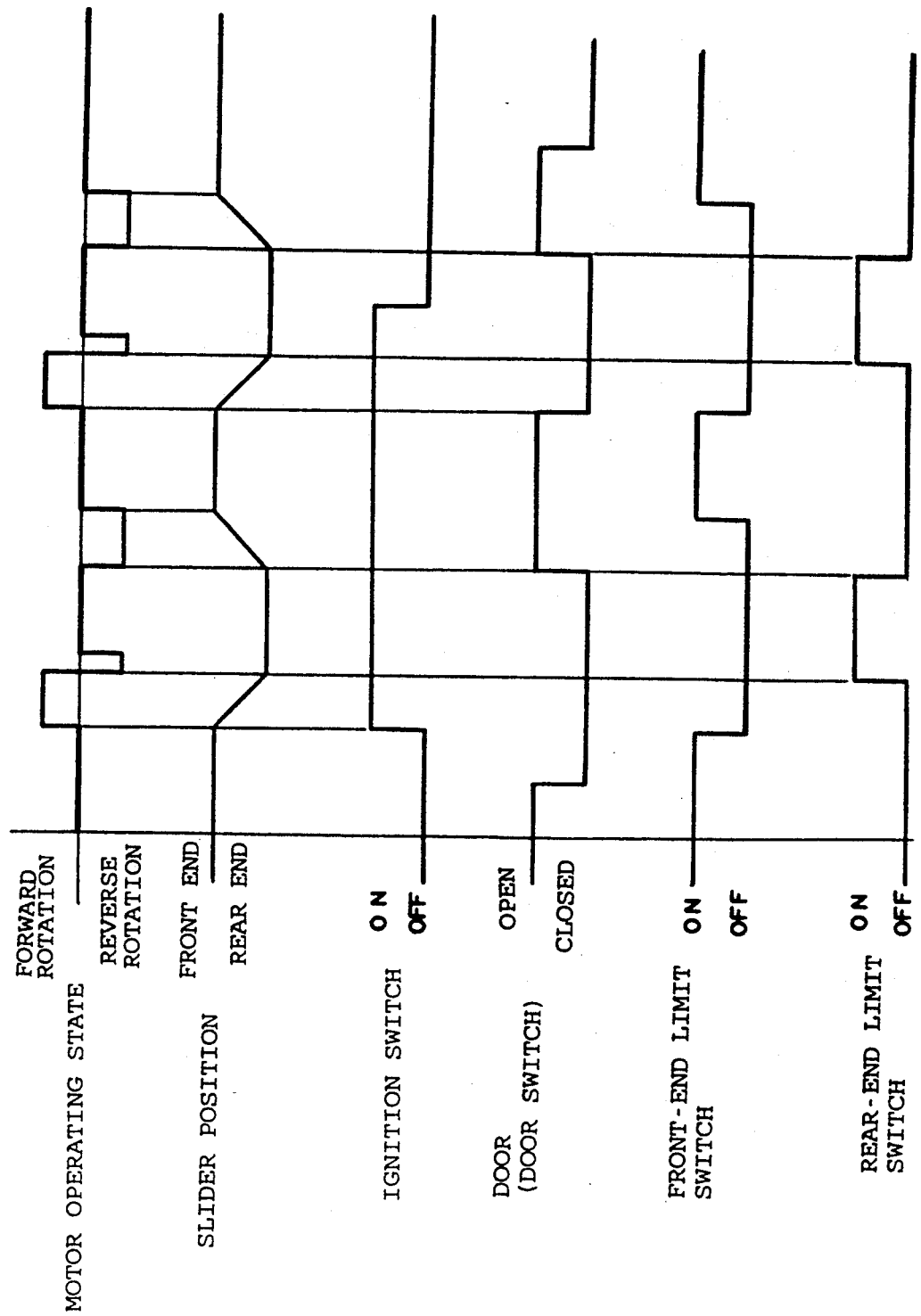
FIG. 8 is a diagram illustrating relationships of correspondence among the slider position, the operating state of each switch, and the operating state of a clutch.

The operation of this embodiment will now be described with reference to the time chart shown in FIG. 8.

When the occupant is to be seated, the slider 24 is located at the end of the guide rail 18 on the front side of the vehicle, so that the front-end limit switch 26 remains turned on. Meanwhile, the motor 29 of the driving unit 28 remains stopped, and since the space between the webbing 34 and the seat is wide, the occupant is able to be seated in the seat.

In addition, in the case where the slider 24 is located at the end of the guide rail 18 on the front side of the vehicle, the slider 24 and the tape 40 are naturally separated from the movable plate 54. In addition, since the movable plate 54 can be slid freely along the reinforcement 50, the connecting position (the position of the webbing to be worn) of the movable plate 54 can be adjusted by moving the movable plate 54.

That is, the movable plate 54 is moved vertically with the nob 98 pulled inwardly of the vehicle compartment, the circular hole 90 of the movable plate 54 is made to correspond with one of the circular holes 50B of the reinforcement 50 at the position desired by the occupant, and the knob 98 being pulled is then released. After the releasing of the knob 98, the lock pin 92 moves outwardly in the transverse direction of the vehicle by the urging force of the compression coil spring 100, and the large-diameter portion 94 is inserted in the circular holes 64, 50B, thereby fixing the movable plate 54.

When the occupant is seated in the seat and closes the door, the door switch 103 is actuated so that the state of the door closed can be confirmed. If the ignition switch 105 is operated by the occupant, the motor 29 of the driving unit 28 is rotated forwardly. Upon the forward rotation of the motor 29, its torque is transmitted to the tape 40 via the worm wheel 37 and the teeth 39, so that tension is produced in the tape 40. Consequently, the slider 24 is moved together with the webbing 34 toward the rear of the vehicle along the guide rail 18.

In addition, simultaneously as the slider 24 moves, the front-end limit switch 26 is turned off.

When the tape 40 moves toward the rear of the vehicle and causes the lost motion piece 78 connected to the tape 40 to abut against the projection 82A of the lost motion lever 82, the lost motion lever 82 rotates counterclockwise as viewed in FIG. 4. The rotation of the lost motion lever 82 causes the extension portion 82B to rotate the pawl 70 clockwise in FIG. 4 about the stepped anchor pin 68 against the urging force of the torsion coil spring 76. While this state is being maintained, the lower end portion of the slider 24 (tip of the recess 74) passes downwardly in FIG. 4 without interfering with the engaging portion 72 of the pawl 70.

As the movement of the slider 24 advances and the lost motion piece 78 passes by the side of the projection 82A of the lost motion lever 82, the pressing of the pawl 70 by the lost motion lever 82 is canceled. As a result, the pawl 70 rotates counterclockwise by means of the urging force of the torsion coil spring 76, and the engaging portion 72 is engaged with the recess 74 of the slider 24. Consequently, the slider 24 is firmly locked by the movable plate 54 via the pawl 70 and the stepped anchor pin 68. In addition, simultaneously with the locking of the slider 24, the lost motion piece 78 is brought into contact with the sliding piece 80 and presses the same, which in turn causes the sliding piece 80 to push down the contactor 86A of the rear-end limit switch 86, thereby actuating the rear-end limit switch 86. Hence, the motor 29 is stopped by the CPU 120, and the movement of the slider 24 is thereby stopped. Furthermore, in this state, the large-diameter portion 94 of the lock pin 92 remains in both the circular hole 90 of the movable plate 54 and the circular hole 50B of the reinforcement 50, so that the movable plate 54 is retained securely by the reinforcement 50. Accordingly, the slider 24 is retained securely by the chassis, and this is the state in which the webbing 34 connected to the slider 24 is applied to the occupant.

Then, immediately after the slider 24 stops, the motor 29 rotates reversely for a predetermined time (e.g, 10 ms), so that the tape 40 and the slider 24 are moved toward the front of the vehicle by a slight amount (e.g., 5 mm).

When the height of the webbing worn is adjusted after the application of the webbing 34, the knob 98 is operated. That is, the movable plate 54 is moved upwardly with the knob 98 pulled inwardly of the vehicle compartment, the circular hole 90 of the movable plate 54 is then made to correspond with the circular hole 50B of the reinforcement 50 at an optimum position for the occupant, and the knob 98 being pulled is released. After the releasing of the knob 98, the lock pin 92 moves outwardly of the transverse direction of the vehicle by means of the urging force of the compression coil spring 100, and the large-diameter portion 94 is inserted in the circular holes 90, 50B, thereby fixing the movable plate 54. For this reason, the height of the webbing worn becomes optimally suited to the occupant, and the occupant is restrained securely by the webbing.

In this case, at a point of time when the slider 24 is locked by the movable plate 54 via the pawl 70 and the stepped anchor pin 68, even after the motor 29 stops, the slider 24 and the tape 40 move slightly due to the inertia of these components and the motor 29. Accordingly, in the conventional arrangement, when the slider 24 and the tape 40 are brought to a complete stop, load acting in the direction of movement of the slider 24 is applied between the large-diameter portion 94 of the lock pin 92 allowing the movable plate 54 to be retained by the reinforcement 50 and the circular holes 50B, 90. Hence, the large-diameter portion 94 of the lock pin 92 and the circular holes 50B, 90 remain abutting against each other with this load acting on them.

In this embodiment, however, the motor 29 is rotated reversely for a predetermined time immediately after the slider 24 stops so as to forcedly move the tape 40 and the slider 24 toward the front side of the vehicle. Hence, the load acting in the direction of movement of the slider 24 is not applied between the large-diameter portion 94 of the lock pin 92 and the circular holes 50B, 90 at the time of altering the retaining position of the movable plate 54 (i.e., the position of the slider 24 being held) by means of the lock pin 92.

Accordingly, when the lock pin 92 is withdrawn from the circular holes 50B, 90, a large frictional force does not occur therebetween, so that a large operating force is not required. Thus, the movable plate 54 can be moved to the operator's desired position by operating the knob 98 with a light operating force so as to alter the retaining position, thereby facilitating the adjustment of the height of the webbing worn.

At the time when the application of the webbing is canceled, if the occupant opens the door, the door switch 103 is turned on to confirm the open state of the door, and the motor 29 of the driving unit 28 is rotated reversely. When the motor 29 is rotated reversely, its torque is transmitted to the tape 40 via the worm wheel 37 and the teeth 39, and a compressive force occurs in the tape 40. For this reason, the slider 24 moves toward the front side of the vehicle (upwardly in FIG. 4) along the guide rail 18.

In addition, simultaneously as the slider 24 moves, the rear-end limit switch 86 is turned off.

As the tape 40 moves toward the front side of the vehicle, the lost motion piece 78 is brought into contact with the projection 82A of the lost motion lever 82, causing the extension portion 82B of the lost motion lever 82 to rotate the pawl 70 to rotate clockwise. As a result the engaging portion 72 of the pawl 70 is disengaged from the recess 74 of the slider 24, and the slider 24 moves toward the front side of the vehicle along the guide rail 18.

As the movement of the slider 24 advances and the slider 24 reaches the end of the guide rail 18 on the front side of the vehicle, the front-end limit switch 26 is turned on, and the motor 29 of the driving unit 28 is stopped. As a result, a large space is created between the webbing 34 and the seat, thereby enabling the occupant to leave the seat.

In addition, if the occupant closes the door again without leaving the seat, the motor 29 of the driving unit 28 rotates forwardly in the same way as described above, so that the slider 24 is moved toward the rear of the vehicle along the guide rail 18, and the front-end limit switch 26 is turned off. When the slider 24 reaches the end of the guide rail 18 on the rear side of the vehicle, the rear-end limit switch 86 is actuated again, which causes the motor 29 to stop, thereby stopping the movement of the slider 24. As a result, the occupant again assumes the state in which the webbing is applied to him or her.

In this case as well, immediately after the slider 24 is stopped, the motor 29 rotates for a predetermined time, so that the tape 40 and the slider 24 are moved slightly toward the front side of the direction. Accordingly, the load acting in the direction of movement of the slider 24 is not applied between the large-diameter portion 94 of the lock pin 92 and the circular holes 50B, 90 at the time of altering the position of the movable plate 54 being retained by the lock 92 (i.e., the position of the slider 24 being held). Accordingly, when the lock pin 92 is withdrawn from the circular holes 50B, 90, a large frictional force does not occur therebetween, so that a large operating force is not required. Thus, the movable plate 54 can be moved to the operator's desired position by operating the knob 98 with a light operating force so as to alter the retaining position, thereby facilitating the adjustment of the height of the webbing worn.

If the door is opened again after the application of the webbing, the door switch 103 is turned on to confirm the state of the door being open in the same way as described above. Then, the motor 29 of the driving unit 28 is rotated reversely so as to move the slider 24 toward the front side of the vehicle, and the rear-end limit switch 86 is turned off at the same time as the slider 24 moves. As the slider 24 moves toward the front side of the vehicle, the application of the webbing 34 is canceled.

Thus, in this embodiment, immediately after the slider 24 is held by the pawl 70 and the stepped anchor pin 68, the motor 29 is rotated reversely for a predetermined time to move the tape 40 and the slider 24, and no load is applied between the lock pin 92 and the circular holes 50B, 90. Accordingly, at the time of altering the position of the slider 24 being held, i.e., the height of the webbing 34 being worn, the movable plate 54 can be moved to the operator's desired position by operating the lock pin 92 with a light operating force, thereby facilitating the adjustment of the height of the webbing worn.

It should be noted that the time when the tape 40 and the slider 24 are moved by reversely rotating the motor 29 may not be confined to immediately after the slider 24 has been held, and the motor 29 may be rotated reversely after a predetermined time has elapsed. In this case as well, at the time of adjusting the height of the webbing 34 worn, the movable plate 54 can be moved to the operator's desired position by operating the lock pin 92 with a light operating force.

A description will now be given of another embodiment of the present invention. It should be noted that those components which are basically identical with those of the first embodiment are denoted by the same reference numerals as those of the first embodiment, and a description thereof will be omitted.

Figure 9:
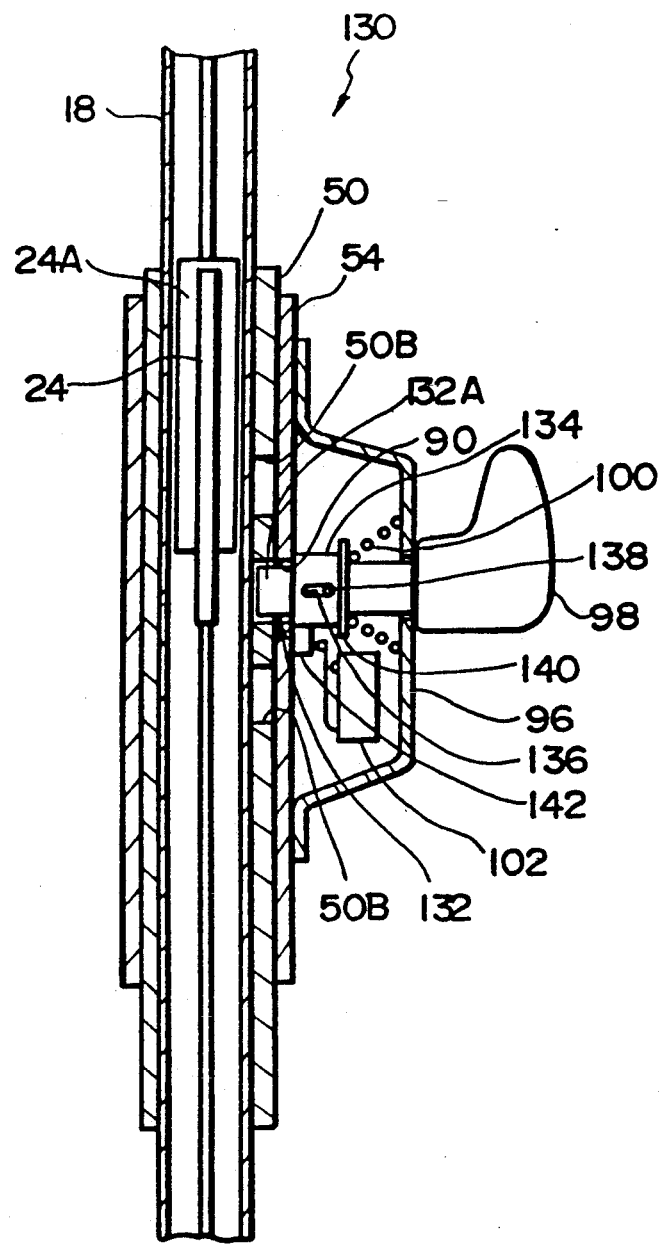
FIG. 9 is a vertical cross-sectional view of the lock pin and its peripheral components of an automatic seat belt system in accordance with a second embodiment.

FIG. 9 shows a cross-sectional view of a lock pin 132 and its peripheral components of an automatic seat belt system 130 in accordance with a second embodiment of the present invention.

In this second embodiment as well, a tip portion (one end portion) 132A of the lock pin 132 is inserted in the circular hole 90 of the movable plate 54 and is further inserted in the circular hole 50B of the reinforcement 50, thereby allowing the movable plate 54 to be connected to and supported by the reinforcement 50. In this case as well, as the movable plate 54 is slid along the reinforcement 50, the tip portion 132A can be fitted in a different circular hole 50B, thereby making it possible to alter the connecting position of the movable plate 54.

The lock pin 132 has its other end portion inserted in and connected to an end portion of a cylindrical connecting pipe 134. That is, an elongated hole 136 which is elongated along the axis is formed on a side wall of the connecting pipe 134, and a pin 138 secured by projecting toward a side wall of the other end portion of the lock pin 132 is fitted movably in the longitudinal direction. Accordingly, the connecting pipe 134 is capable of moving relative to the lock pin 132 within the range in which the pin 138 is capable of moving along the elongated hole 136.

A disk-shaped flange 140 is formed projecting radially from a substantially intermediate portion, as viewed in the axial direction, of the connecting pipe 134. The compression coil spring 100 is interposed between the flange 140 and the tension holder 96. For this reason, the connecting pipe is constantly urged toward the tip portion 132A of the lock pin 132, and in this state the pin 138 abuts against the tension holder-side end of the elongated hole 136.

The other end portion of the connecting pipe 134 is secured to the knob 98 after being inserted through the tension holder 96.

An operation switch 102 serving as an altering operation detecting means is disposed on a side of the connecting pipe 134. The operation switch 102 is adapted to be actuated by being brought into contact with a projecting piece 142 provided on an outer periphery of the one end portion of the connecting pipe 134 when the connecting pipe 134 is operated against the urging force of the compression coil spring 100 and is pulled out inwardly of the vehicle compartment by a length corresponding to the longitudinal length of the elongated hole 136. This operation switch 102 is connected to the CPU 120, and when the operation switch 102 has been actuated, the motor 29 is controlled by the CPU 120 and is rotated reversely by a predetermined time.

A description will now be given of the operation of this second embodiment.

In the second embodiment as well, when the slider 24 is held by the pawl 70 and the stepped anchor pin 68, this state is detected by the rear-end limit switch 86 and the motor 29 is stopped, thereby stopping the movement of the slider 24. As a result, the occupant assumes the state in which the webbing 34 is applied to him or her.

When adjusting the height of the webbing 34 after it is worn, the knob 98 is pulled inwardly of the vehicle compartment against the urging force of the compression coil spring 100. Upon operation of the knob 98, the connecting pipe 134 is moved relative to the lock 132, which in turn causes the pin 138 to move along the elongated hole 136 (at this point of time, the tip portion 132A of the lock pin 132 still remains inserted in the circular holes 50B, 90). Then, the projecting piece 142 is brought into contact with the operation switch 102, thereby actuating the operation switch 102. As a result, the motor 29 is controlled by the CPU 120, the motor 29 is rotated reversely for a predetermined time in the same way as the first embodiment, thereby allowing the tape 40 and the slider 24 to move slightly toward the front side of the vehicle.

If the knob 98 is further pulled together with the connecting pipe 134, the pin 138 abuts against the end of the elongated hole 136 opposite to the knob 98. In consequence, the lock pin 132 is pulled and moved together with the connecting pipe 134, with the result that the engagement between the tip portion 132A of the lock pin 132 and the circular hole 50B of the reinforcement 50 is canceled. Subsequently, the position of the movable plate 54 can be adjusted by upwardly moving the movable plate 54 with the knob 98 being pulled, so that the height of the webbing worn becomes optimally suited to the occupant, and the occupant is restrained securely by the webbing.

In this case as well, at the time of altering the position of the movable plate 54 being retained by the lock pin 132, i.e., at the time of canceling the engagement between the tip portion 132A of the lock pin 132 and the circular hole 50B of the reinforcement 50, the operation of the knob 98 and the connecting pipe 134 being pulled is detected by the operation switch 102, and the motor 29 is rotated reversely for a predetermined time, allowing the tape 40 and the slider 24 to be moved forcedly toward the front of the vehicle. As a result, the load acting in the direction of movement of the slider 24 is not applied between the tip portion 132A of the lock pin 132 and the circular holes 50B, 90. Accordingly, when the lock pin 132 is withdrawn from the circular holes 50B, 90, a large frictional force does not occur therebetween, so that a large operating force is not required. Thus, the movable plate 54 can be moved to the operator's desired position by operating the knob 98 with a light operating force so as to alter the retaining position, thereby facilitating the adjustment of the height of the webbing worn.

In this second embodiment, the arrangement provided is such that at the time of altering the position of the movable plate 54 being retained by the lock pin 132, the operation of pulling the knob 98 is detected so as to reversely rotate the motor 29 immediately before canceling the engagement between the tip portion 132A of the lock pin 132 and the circular hole 50B of the reinforcement 50. Alternatively, the detection of the operation for altering the retaining position (i.e., the operation for canceling the engagement between the tip portion 132A of the lock pin 132 and the circular hole 50B of the reinforcement 50) may not be confined to the above-described arrangement, and another means may be used for that purpose.

For instance, in the above-described embodiment, the arrangement provided is such that when the connecting pipe 134 is pulled out in the axial direction by a length corresponding to the longitudinal length of the elongated hole 136, the operation of pulling the knob 98 and the connecting pipe 134 is detected by the operation switch 102, whereupon the motor 29 is rotated reversely. However, an arrangement may be alternatively provided such that this operation is detected when the knob 98 and the connecting pipe 134 are rotated by a predetermined angle so as to reversely rotate the motor 29. That is, an elongated hole may be formed on a side wall of the connecting pipe 134 in a circumferential direction, and by allowing the pin 138 of the lock pin 132 to be fitted therein, the connecting pipe 134 is made rotatable relative to the lock pin 132 by a predetermined angle. Then, the rotating operation of this connecting pipe 134 may be detected by an operation switch or the like. In this case, after the rotating operation, the lock pin 132 is pulled out to cancel the engagement. It should be noted that in such an arrangement it is preferable to arrange the lock pin 132 in such a manner that the pulling out operation is allowed only after the rotating operation is effected. In addition, an arrangement may be provided such that a so-called touch sensor capable of the operation (gripping) by the occupant is incorporated in the knob 98, whereby the alteration of the retaining position of the movable plate 54 is detected so as to reversely rotate the motor 29.

In these cases as well, at the time of pulling the lock pin 132 out of the circular holes 50B, 90, a large frictional force is not produced therebetween, so that a large operating force is not required, thereby making it possible to facilitate the adjustment of the height of the webbing worn.

A description will now be given of a third embodiment of the present invention.

Figure 10:
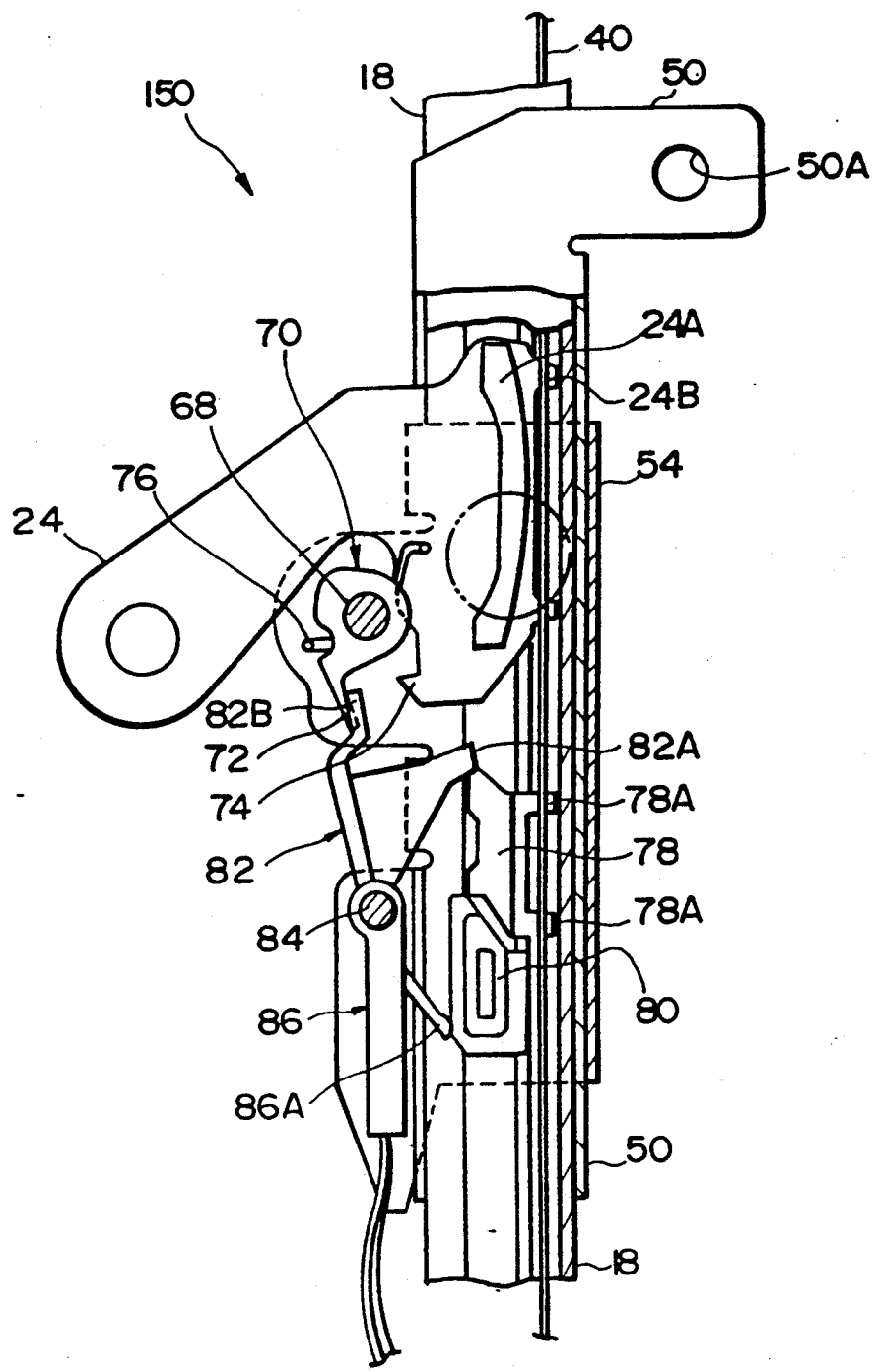
FIG. 10 is a vertical cross-sectional view of a pawl, a lost motion lever, and their peripheral components of an automatic seat belt system in accordance with a third embodiment.

FIG. 10 shows a cross-sectional view of the pawl 70, the lost motion lever 82 and their peripheral components of an automatic seat belt system 150 in accordance with the third embodiment of the present invention. The arrangement of this embodiment is substantially similar to that of the first embodiment, and a description will be given centering on portions different from those of the first embodiment.

In the third embodiment as well, the arrangement provided is such that the lock pin 92 is inserted in the circular hole 90 of the movable plate 54, and the large-diameter portion 94 after being inserted in the circular hole 90 is inserted in the circular hole 40B of the reinforcement 50, whereby the movable plate 54 is connected to and supported by the reinforcement 50. In this case as well, as the movable plate 54 is slid along the reinforcement 50, the large-diameter portion 94 can be fitted in a different circular hole 50B, thereby making it possible to alter the connecting position of the movable plate 54.

Meanwhile, as shown in FIG. 10, the sliding piece 80 serving as a position detecting means, which is brought into contact with the lost motion piece 78 connected to the tape 40 when the lost motion piece 78 is moved downwardly, as well as the contactor 86A of the rear-end limit switch 86 are disposed slightly more closely to the lost motion lever 82 as compared with the foregoing embodiments. That is, the layout is set as follows: When the lost motion piece 78 is moved downwardly with the movement of the tape 40 and abuts against the projection 82A of the lost motion lever 82, causing the extension portion 82B to press the engaging portion 72 of the pawl 70 in the direction in which the engaging portion 72 moves away from the recess 74 of the slider 24 (i.e., already before the slider 24 is completely held by the pawl 70 and the stepped anchor pin 68), the slider piece 80 is pressed by the lost motion piece 78 and abuts against the contactor 86A, thereby actuating the rear end limit switch 86.

In this third embodiment, when the rear-end limit switch 86 is actuated, the motor 29 is stopped by the CPU 120. However, even after the motor 29 stops, the slider 24 and the tape move slightly due to the inertia of these components and the motor 29, and when the slider 24 and the tape 40 are brought to a complete stop, the slider 24 is completely held by the pawl 70 and the stepped anchor pin 68. When the slider 24 and the tape 40 are completely held, i.e., when the slider 24 has stopped completely, the load acting in the direction of movement of the slider owing to the movement of the slider 24 is not applied between the large-diameter portion 94 of the lock pin 92 and the circular holes 50B, 90. Accordingly, in this case as well, when the lock pin 92 is pulled out of the circular holes 50B, 90, a large frictional force does not occur therebetween, so that a large operation is not required. Hence, the adjustment of the height of the webbing worn can be facilitated.

A description will now be given of a fourth embodiment of the present invention.

Figure 11:
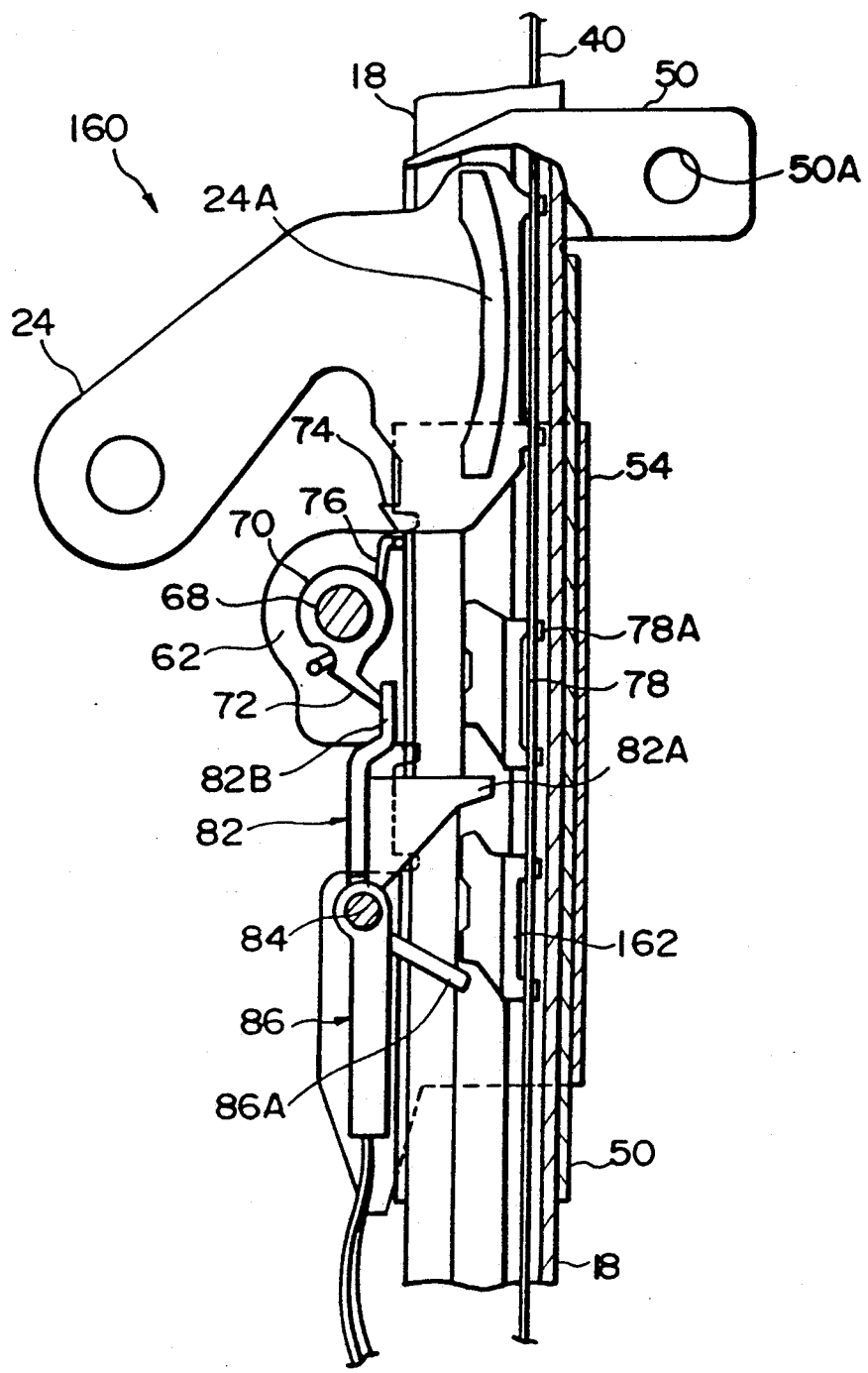
FIG. 11 is a vertical cross-sectional view of a pawl, a lost motion lever, and their peripheral components of an automatic seat belt system in accordance with a third embodiment.

FIG. 11 shows a cross-sectional view of the pawl 70, the lost motion lever 82, and their peripheral portions of an automatic seat belt system 160 in accordance with the fourth embodiment of the present invention. The arrangement of this embodiment is substantially similar to that of the first embodiment, and a description will be given centering on portions different from those of the first embodiment.

In this fourth embodiment as well, the movable plate 54 is connected to the reinforcement 50 via the lock pin 92, and its connecting position can be altered.

Meanwhile, a piece 162 serving as a position detecting means in substitution of the sliding piece 80 used in the first embodiment is connected to the tape 40 below the lost motion piece 78. The piece 162 is capable of contacting the contactor 86A of the rear-end limit switch 86 when the piece 162 moves downward together with the tape 40. Furthermore, the lost motion piece 78 is subsequently brought into contact with the contactor 86A, thereby actuating the rear-end limit switch 86.

In addition, the connecting position of the piece 162 with respect to the tape 40 is set in such a manner that when the extension portion 82B of the lost motion lever 82 presses the engaging portion 72 of the pawl 70 in the direction in which the engaging portion 72 moves away from the recess 74 of the slider 24 (i.e., already before the slider 24 is completely held by the pawl 70 and the anchor pin 68), the piece 162 contacts the contactor 86A so as to actuate the rear-end limit switch 86.

When the piece 162 is brought into contact with the contactor 86A and the rear-end limit switch 86 is thereby actuated, as shown in FIG. 12, the motor 29 is controlled by the CPU 120, and the rotating speed of the motor 29 (i.e., the moving speed of the slider 24) is decelerated. Subsequently, when the lost motion piece 78 is brought into contact with the contactor 86A and the rear-end limit switch 86 is thereby actuated, the motor 29 is stopped by the CPU 120.

In this fourth embodiment, as described above, the piece 162 is brought into contact with the contactor 86A and the rear-end limit switch 86 is thereby actuated, and the motor 29 is controlled by the CPU 120 so as to decelerate the rotating speed of the motor 29. Accordingly, when with the subsequent progress in the movement of the slider 24 the lost motion piece 78 is brought into contact with the contactor 86A, actuating the rear-end limit switch 86 to stop the motor 29, the inertia of the slider 24, the tape 40, and the motor 29 becomes extremely small. Therefore, it is possible to prevent the slider 24 and the tape 40 from moving unnecessarily (i.e., overrunning) after the stopping of the motor 29.

As a result, when the slider 24 and the tape 40 are stopped, and the slider 24 is completely held by the pawl 70 and the stepped anchor pin 68, the load acting in the direction of movement of the slider owing to the movement of the slider 24 is not applied between the large-diameter portion 94 of the lock pin 92 and the circular holes 50B, 90. Accordingly, in this case as well, at the time of pulling the lock pin 92 out of the circular holes 50B, 90, a large frictional force does not occur therebetween, so that a large operating force is not required. Hence, the adjustment of the height of the webbing worn can be facilitated.

In the fourth embodiment described above, the arrangement provided is such that the piece 162 and the lost motion piece 78 are brought into contact with the contactor 86A to actuate the rear-end limit switch 86, thereby detecting the position of the slider 24 (the deceleration starting position and the stopping position). However, an arrangement may be alternatively provided such that the deceleration starting position and stopping position of the slider 24 are detected by another means. For instance, the amounts of movement of the tape 40 and the slider 24 may be calculated by measuring the amount of rotation of the motor 29 and the number of the openings 40A of the tape 40 thereby to determine the deceleration starting position and stopping position of the slider 24.

In addition, in the fourth embodiment the arrangement provided is such that the moving speed of the slider 24 is decelerated to a fixed speed after the slider 24 has reached the deceleration starting position. However, the mode of deceleration of the slider 24 may not be confined to the same and, for example, an arrangement may be provided such that the moving speed of the slider 24 may be varied in multiple stages or in a stepless manner by controlling the rotation of the motor 29 by means of pulse signals or the like.

In such a case as well, the overrunning of the slider 24 after the stopping of the motor 29 can be prevented, and the adjustment of the height of the webbing worn can be facilitated.

As described above, with the automatic seat belt system in accordance with the present invention, at least at the time of altering the position in which the slider holding member is held by means of the retaining means (i.e., the position of the slider being held), the slider is controlled by the controlling means via the driving source, and no load which resists the operation for altering the retaining position is applied to the retaining means. Accordingly, the present invention offers the advantage that the retaining means can be moved to the occupant's desired position with a light operating force so as to alter the position in which the slider holding member is retained, thereby facilitating the adjustment of the height of the webbing worn.

What is claimed is:

1. An automatic seat belt system comprising:
   a guide rail disposed in a vehicle compartment;
   a slider to which a webbing for restraining an occupant of the vehicle is attached and which is adapted to be guided by said guide rail so as to be movable between a webbing-application canceling position and a webbing applying position;
   a driving source for moving said slider along said guide rail between the webbing-application canceling position and the webbing applying position;
   a slider holding member for holding said slider by being engaged therewith at the webbing applying position, and capable of moving in a longitudinal direction of said guide rail relative to said guide rail;
   retaining means for causing said slider holding member to be retained by a chassis at one of a plurality of positions set along the longitudinal direction of said guide rail, engagement of said slider holding member with said said chassis capable of being canceled by an operation; and
   controlling means for controlling said slider via said driving source in such a manner that said slider is located at a position where load resisting said operation does not act on said retaining means, at least at the time of said operation of said retaining means.

2. An automatic seat belt system according to claim 1, wherein said controlling means is adapted to effect the control of said slider when said slider is held by said slider holding member.

3. An automatic seat belt system according to claim 1, wherein said controlling means comprises altering operation detecting means for detecting said operation of said retaining means, and is adapted to effect the control of said slider when said operation is detected by said altering operation detecting means.

4. An automatic seat belt system according to claim 1, wherein said controlling means comprises position detecting means for detecting a predetermined position of said slider before said slider is held by said slider holding member, and is adapted to effect the control of said slider by stopping said driving source when said predetermined position is detected by said position detecting means.

5. An automatic seat belt system according to claim 1, wherein said controlling means comprises position detecting means for detecting a predetermined position of said slider before said slider is held by said slider holding member, and is adapted to effect the control of said slider by decelerating the speed of said driving source when said predetermined position is detected by said position detecting means and by subsequently stopping said driving source.

6. An automatic seat belt system according to claim 1, wherein said retaining means is constituted by a lock pin which is supported by said slider holding member and adapted to retain said slider holding member onto said chassis as said lock pin is inserted into a hole provided on a side of said chassis.

7. An automatic seat belt system according to claim 6, wherein said lock pin is constantly urged by urging means in a direction in which said lock pin is inserted into said hole.

8. An automatic seat belt system comprising:
   a guide rail disposed in a vehicle compartment along a longitudinal direction of the vehicle;
   a slider to which a webbing for restraining an occupant of the vehicle is attached and which is supported by said guide rail so as to be movable between a webbing-application canceling position located at an end portion of said guide rail on a front side of the vehicle and a webbing applying position located at an end portion thereof on a rear side of the vehicle;
   a driving source connected to said slider via an elongated member and adapted to move said slider along said guide rail between the webbing-application canceling position and the webbing applying position;
   a slider holding member adapted to hold said slider by being engaged therewith at the webbing applying position, and capable of moving by a predetermined range in a longitudinal direction of said guide rail relative to said guide rail;
   retaining means supported by said slider holding member and adapted to cause said slider holding member to be retained by a chassis at one of a plurality of positions set along the longitudinal direction of said guide rail, engagement of said slider holding member with said chassis capable of being canceled by an operation effected by the occupant of the vehicle; and
   controlling means for controlling said slider via said driving source in such a manner that said slider is located at a position where load resisting said operation does not act on said retaining means, at least at the time of said operation of said retaining means.

9. An automatic seat belt system according to claim 8, wherein a longitudinal direction of said end portion of said guide rail on the rear side of the vehicle is set substantially in a vertical direction of the vehicle.

10. An automatic seat belt system according to claim 9, wherein said retaining means is constituted by a lock pin which is adapted to retain said slider holding member onto said chassis as said lock pin is inserted into a hole provided on a side of said chassis, the retention being canceled as an operation of pulling said lock pin out of said hole.

11. An automatic seat belt system according to claim 10, wherein said lock pin is constantly urged by urging means in a direction in which said lock pin is inserted into said hole.

12. An automatic seat belt system according to claim 11, wherein said controlling means is adapted to drive said driving means in such a manner as to move said slider by a predetermined distance from the webbing applying position toward the webbing-application canceling position after said slider is held by said slider holding member.

13. An automatic seat belt system according to claim 11, wherein said controlling means comprises altering operation detecting means for detecting the operation of pulling out said lock pin and is adapted to drive said driving means in such a manner as to move said slider by a predetermined distance from the webbing applying position toward the webbing-application canceling position when the pulling out operation is detected by said altering operation detecting means.

14. An automatic seat belt system according to claim 11, wherein said lock pin is capable of being operated in such a manner as to rotate about its axis, and said controlling means comprises altering operation detecting means for detecting the rotating operation of said lock pin and is adapted to drive said driving means in such a manner as to move said slider by a predetermined distance from the webbing applying position toward the webbing-application canceling position when the rotating operation is detected by said altering operation detecting means.

15. An automatic seat belt system according to claim 11, wherein said lock pin comprises a knob for being operated by the occupant, said controlling means comprises detecting means for detecting the gripping of said knob by the occupant, and said driving means is driven in such a manner as to move said slider by a predetermined distance from the webbing applying position toward the webbing-application canceling position when the gripping of said knob is detected by said detecting means.

16. An automatic seat belt system according to claim 11, wherein said controlling means comprises detecting means disposed at a predetermined position between the webbing-application canceling position of said slider and the webbing applying position thereof an adapted to detect said slider at said predetermined position while said slider is moving from the webbing-application canceling position to the webbing applying position, the control of said slider being effected by stopping said driving source when said slider is detected by said detecting means.

17. An automatic seat belt system according to claim 11, wherein said controlling means comprises detecting means disposed at a predetermined position between the webbing-application canceling position of said slider and the webbing applying position thereof an adapted to detect said slider at said predetermined position while said slider is moving from the webbing-application canceling position to the webbing applying position, the control of said slider being effected by decelerating the the speed of said driving source when said slider is detected by said detecting means and by subsequently stopping said driving source.

18. An automatic seat belt system comprising:
a guide rail disposed in a vehicle compartment along a longitudinal direction of the vehicle, an end portion of said guide rail on a rear side of the vehicle being bent downwardly;
a reinforcement member for securing said end portion of said guide rail on the rear side of the vehicle onto a chassis;
a slider to which a webbing for restraining an occupant of the vehicle is attached and which is supported by said guide rail so as to be movable between a webbing-application canceling position located at an end portion of said guide rail on a front side of the vehicle and a webbing applying position located at an end portion thereof on a rear side of the vehicle;
a motor connected to said slider via an elongated member and adapted to move said slider along said guide rail between the webbing-application canceling position and the webbing applying position;
a slider holding member fitted over said reinforcement member in such a manner as to be movable relative to said guide rail by a predetermined range along the longitudinal direction of said guide rail and adapted to hold said slider by being engaged therewith at the webbing applying position;
a lock pin supported by said slider holding member and adapted to cause said slider holding member to be retained by a chassis via said reinforcement member by being selectively inserted in one of a plurality of positions provided in said reinforcement along the longitudinal direction of said guide rail, engagement of said slider holding member with said chassis capable of being canceled as said lock pin is pulled out of said hole by an operation effected by the occupant of the vehicle; and
controlling means for controlling said slider via said driving source in such a manner that said slider is located at a position where load resisting said operation does not act on said retaining means, at least at the time of said operation of said retaining means.

* * * * *